United States Patent
Izadian

(10) Patent No.: US 10,394,204 B1
(45) Date of Patent: *Aug. 27, 2019

(54) METHODS AND SYSTEMS FOR SYNTHESIS OF A WAVEGUIDE ARRAY ANTENNA

(71) Applicant: Waymo LLC, Mountain View, CA (US)

(72) Inventor: Jamal Izadian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/682,165

(22) Filed: Aug. 21, 2017

Related U.S. Application Data

(63) Continuation of application No. 14/454,371, filed on Aug. 7, 2014, now Pat. No. 9,766,605.

(51) Int. Cl.
*G05B 15/02* (2006.01)
*H01Q 21/00* (2006.01)

(52) U.S. Cl.
CPC ........... *G05B 15/02* (2013.01); *H01Q 21/005* (2013.01); *H01Q 21/0087* (2013.01)

(58) Field of Classification Search
None
See application file for complete search history.

(56) References Cited

U.S. PATENT DOCUMENTS

| | | | |
|---|---|---|---|
| 3,696,433 A | 10/1972 | Killion et al. |
| 5,565,878 A | 10/1996 | Legerlof |
| 5,596,336 A | 1/1997 | Liu |
| 6,182,354 B1 | 2/2001 | Weeks |
| 6,232,910 B1 | 5/2001 | Bell et al. |
| 6,243,024 B1 | 6/2001 | Yamabuchi et al. |
| 6,297,782 B1 | 10/2001 | Matthews et al. |
| 6,317,095 B1 | 11/2001 | Teshirogi et al. |
| 6,563,398 B1 | 5/2003 | Wu |
| 6,642,908 B2 | 11/2003 | Pleva et al. |
| 7,202,832 B2 | 4/2007 | Wang |
| 7,423,604 B2 | 9/2008 | Nagai |
| 7,450,072 B2 | 11/2008 | Kim et al. |
| 7,576,703 B1 | 8/2009 | Herting et al. |
| 7,783,403 B2 | 8/2010 | Breed |
| 7,928,919 B2 | 4/2011 | Margomenos |
| 8,013,694 B2 | 9/2011 | Hiramatsu et al. |

(Continued)

*Primary Examiner* — Ryan A Jarrett
(74) *Attorney, Agent, or Firm* — McDonnell Boehnen Hulbert & Berghoff LLP

(57) ABSTRACT

A method may involve receiving one or more criteria for a waveguide array antenna. The waveguide array antenna includes a plurality of waveguides. The plurality of waveguides may include a plurality of radiation elements. The method may also involve determining a dataset configured to associate radiation characteristics of a given radiation element with given configuration parameters including a given resonance length a given rotation angle of the given radiation element. The method also involves generating configuration parameters for the plurality of radiation elements based on the dataset. The configuration parameters may cause the waveguide array antenna to be associated with the one or more criteria. The method may also involve providing a request for fabrication of the waveguide array antenna to have the plurality of radiation elements configured according to the configuration parameters.

20 Claims, 7 Drawing Sheets

(56) References Cited

U.S. PATENT DOCUMENTS

| | | |
|---|---|---|
| 8,134,427 B2 | 3/2012 | Fujita |
| 9,766,605 B1 * | 9/2017 | Izadian .............. H01Q 21/0087 |
| 2005/0113952 A1 * | 5/2005 | Shimizu ................ H01Q 1/242 |
| | | 700/97 |
| 2007/0013598 A1 | 1/2007 | Artis et al. |
| 2009/0121952 A1 | 5/2009 | Shibuya et al. |
| 2009/0300901 A1 | 12/2009 | Artis et al. |
| 2010/0085263 A1 | 4/2010 | Yano |
| 2011/0291874 A1 | 12/2011 | De Mersseman |
| 2013/0141186 A1 | 6/2013 | Nguyen et al. |
| 2013/0236189 A1 | 9/2013 | Yamamoto et al. |
| 2013/0321229 A1 | 12/2013 | Klefenz et al. |
| 2014/0218251 A1 | 8/2014 | Waschenko et al. |
| 2015/0370097 A1 | 12/2015 | Lin et al. |
| 2016/0028164 A1 | 1/2016 | Watanabe et al. |

* cited by examiner

METHODS AND SYSTEMS FOR SYNTHESIS OF A WAVEGUIDE ARRAY ANTENNA

CROSS-REFERENCE TO RELATED APPLICATION

This application is a continuation of U.S. application Ser. No. 14/454,371, filed Aug. 7, 2014, the contents of which are entirely incorporated herein by reference as if fully set forth in this application.

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. The radar sensor can thus be used, for instance, by an autonomous vehicle control system to avoid obstacles indicated by the sensor information.

Some example automotive radar systems may be configured to operate at an electromagnetic wave frequency of 77 Giga-Hertz (GHz), which corresponds to millimeter (mm) electromagnetic wave length (e.g., 3.9 mm for 77 GHz). These radar systems may use antennas that can to focus the radiated energy into tight beams in order to enable the radar system to measure an environment with high accuracy, such as an environment around an autonomous vehicle. Such antennas may be compact (typically with rectangular form factors), efficient (i.e., there should be little 77 GHz energy lost to heat in the antenna, or reflected back into the transmitter electronics), low cost, and easy to manufacture.

SUMMARY

In one example, a method is provided that includes a device receiving one or more criteria for a waveguide array antenna. The device may include one or more processors. The waveguide array antenna may include a plurality of waveguides. A given waveguide may have a broad-side having a first width and a short-side having a second width less than the first width. The plurality of waveguides may include a plurality of radiation elements arranged within short-sides of the plurality of waveguides according to a given arrangement. The method also includes determining a dataset configured to associate radiation characteristics of a given radiation element with given configuration parameters including a given resonance length and a given rotation angle of the given radiation element. The method also includes generating configuration parameters for the plurality of radiation elements based on the dataset. The configuration parameters may cause the waveguide array antenna to be associated with the one or more criteria. The method also includes the device providing a request for fabrication of the waveguide array antenna to have the plurality of radiation elements configured according to the configuration parameters.

In another example, a non-transitory computer readable medium is provided. The non-transitory computer readable medium may have instructions stored therein that when executed by a computing device, cause the computing device to perform functions. The functions comprise receiving one or more criteria for a waveguide array antenna. The waveguide array antenna may include a plurality of waveguides. A given waveguide has a broad-side having a first width and a short-side having a second width less than the first width. The plurality of waveguides may include a plurality of radiation elements arranged within short-sides of the plurality of waveguides according to a given arrangement. The functions further comprise determining a dataset configured to associate radiation characteristics of a given radiation element with given configuration parameters including a given resonance length and a given rotation angle of the given radiation element. The functions further comprise generating configuration parameters for the plurality of radiation elements based on the dataset. The configuration parameters may cause the waveguide array antenna to be associated with the one or more criteria. The functions further comprise providing a request for fabrication of the waveguide array antenna to have the plurality of radiation elements configured according to the configuration parameters.

In yet another example, a device is provided that includes one or more processors and data storage configured to store instructions executable by the one or more processors. The instructions may cause the device to receive one or more criteria for a waveguide array antenna. The waveguide array antenna may include a plurality of waveguides. A given waveguide may have a broad-side having a first width and a short-side having a second width less than the first width. The plurality of waveguides may include a plurality of radiation elements arranged within short-sides of the plurality of waveguides according to a given arrangement. The instructions may also cause the device to determine a dataset configured to associate radiation characteristics of a given radiation element with given configuration parameters including a given resonance length and a given rotation angle of the given radiation element. The instructions may also cause the device to generate configuration parameters for the plurality of radiation elements based on the dataset. The configuration parameters may cause the waveguide array antenna to be associated with the one or more criteria. The instructions may also cause the device to provide a request for fabrication of the waveguide array antenna to have the plurality of radiation elements configured according to the configuration parameters.

In still another example, a system is provided that comprises a means for receiving one or more criteria for a waveguide array antenna. The waveguide array antenna may include a plurality of waveguides. A given waveguide may have a broad-side having a first width and a short-side having a second width less than the first width. The plurality of waveguides may include a plurality of radiation elements arranged within short-sides of the plurality of waveguides according to a given arrangement. The system further comprises a means for determining a dataset configured to associate radiation characteristics of a given radiation element with given configuration parameters including a given resonance length and a given rotation angle of the given radiation element. The system further comprises a means for generating configuration parameters for the plurality of radiation elements based on the dataset. The configuration parameters may cause the waveguide array antenna to be associated with the one or more criteria. The system further comprises a means for providing a request for fabrication of the waveguide array antenna to have the plurality of radiation elements configured according to the configuration parameters.

These as well as other aspects, advantages, and alternatives, will become apparent to those of ordinary skill in the art by reading the following detailed description, with reference where appropriate to the accompanying figures.

DETAILED DESCRIPTION

Figure 1:
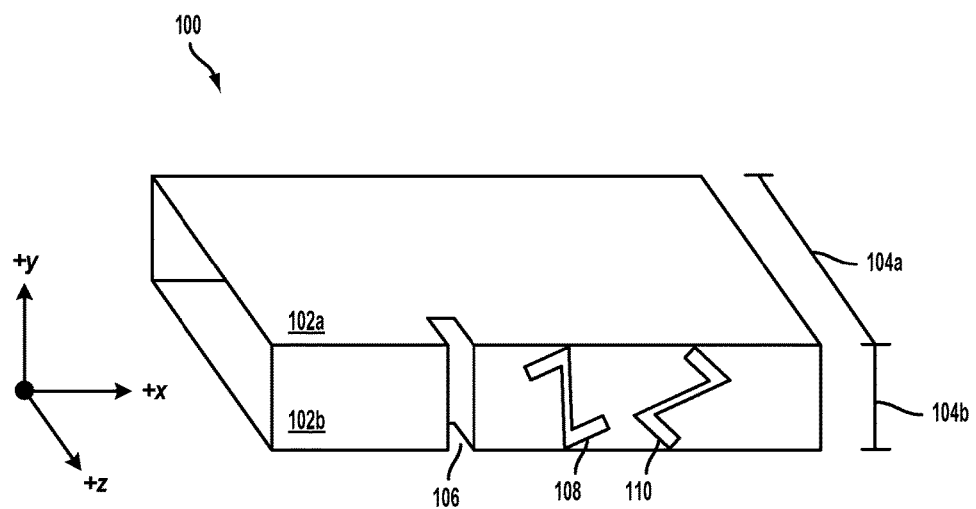
FIG. 1 illustrates an example waveguide, in accordance with at least some embodiments herein.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Within examples, a waveguide may be constructed from a conducting material, such as a metal, and may have dimensions suitable to allow an electromagnetic wave having a particular frequency to propagate along the waveguide. In some instances, the waveguide may also include radiation elements, such as slots, to cause the waveguide to radiate electromagnetic energy via the radiation elements into an environment of the waveguide. Various configuration parameters of the radiation elements, such as positions, orientations, shapes, dimensions, etc., may be selected according to desired radiation characteristics of the radiated electromagnetic energy, as well as other criteria such as an input impedance of the waveguide, a form factor of the waveguide, a manufacturing process of the waveguide, or any other criteria.

Therefore, the various criteria may be specific to a particular application of the waveguide and corresponding configuration parameters of the radiation elements may be selected accordingly. Further, mutual coupling between the radiation elements may affect the radiation characteristics of the radiated electromagnetic energy from the waveguide, which may increase complexity of determining the configuration parameters of the radiation elements. To that end, the effect of mutual coupling may also be exacerbated in instances where the waveguide is included in an array of waveguides such as a waveguide array antenna arrangement.

Accordingly, some embodiments herein may include systems and methods for determining configuration parameters of a plurality of radiation elements to synthesize a waveguide array antenna according to such criteria.

In one example, a method is provided that involves receiving one or more criteria for a waveguide array antenna. The waveguide array antenna may include a plurality of waveguides. The plurality of waveguides may include a plurality of radiation elements. The method may also involve determining a dataset configured to associate radiation characteristics of a given radiation element with given configuration parameters including a given resonance length and a given rotation angle of the given radiation element. By way of example, particular admittance characteristics of the given radiation element may be associated with the given resonance length and the given rotation angle in the dataset. The method may also involve generating configuration parameters for the plurality of radiation elements based on the dataset. The configuration parameters may be to cause the waveguide array antenna to be associated with the one or more criteria. By way of example, the dataset may be utilized to determine a given arrangement, sizing, orientation, etc., of the plurality of radiation elements to cause the waveguide array antenna to have characteristics defined by the one or more criteria.

Some embodiments herein may therefore include a computing device for generating instructions for synthesis of the waveguide array antenna based on the one or more criteria. For example, the computing device may simulate the behavior of the plurality of radiation elements in various arrangements and configurations to generate the configuration parameters that correspond to the one or more criteria. Such configuration parameters may then be transmitted, for example, to a fabrication device such as a machining system to fabricate the waveguide array antenna in accordance with the one or more criteria.

Referring now to the Figures, FIG. 1 illustrates an example waveguide 100, in accordance with at least some embodiments herein. The waveguide 100 includes a broad-side 102a having a first width 104a and a short-side 102b having a second width 104b. The waveguide 100 also includes radiation elements 106, 108, and 110 illustrated in FIG. 1 as radiating slots. It should be understood that the waveguide 100 presents one possible configuration of the radiation elements 106-110. Other configurations are possible as well. The waveguide 100 may be formed from various solid materials, such as metals, carbon fibers, composites, plastics, etc.

It should also be understood that a given application of such an antenna as the waveguide 100 may determine appropriate dimensions and sizes for both the radiation elements 106-110 and the waveguide 100. For instance, as discussed above, some example radar systems (e.g., that include the waveguide 100) may be configured to operate at an electromagnetic wave frequency of 77 GHz, which corresponds to 3.9 millimeter electromagnetic wave length. At this frequency, the channels, ports, etc. of an apparatus that includes the waveguide 100 may be fabricated to have given dimensions appropriated for the 77 GHz frequency. Other example antennas and antenna applications are possible as well.

As shown in FIG. 1, the second width 104b of the short-side 102b of the waveguide 100 extends in the Y direction and the first width 104a of the broad-side 102a extends in the X direction. Both the first width 104a and the second width 104b of the waveguide 100 may be chosen based on a frequency of operation for the waveguide 100. For example, when operating waveguide 100 at 77 GHz, the waveguide 100 may be constructed with the first width 104a and the second width 104b to allow propagation of a 77 GHz wave. An electromagnetic wave, for example, may propagate through the waveguide in the X direction. In some examples, the waveguide 100 may have a standard size such as a WR-12 or WR-10. A WR-12 waveguide may support the propagation of electromagnetic waves between 60 GHz and 90 GHz. Additionally, a WR-12 waveguide may have the internal dimensions of approximately 3.1 mm by 1.55 mm. A WR-10 waveguide may support the propagation of electromagnetic waves between 75 GHz and 110 GHz. Additionally, a WR-10 waveguide may have the internal dimensions of approximately 2.54 mm by 1.27 mm. The dimensions of the WR-12 and the WR-10 waveguides are presented by way of example. Other dimensions are possible as well.

Waveguide 100 may be further configured to radiate at least a portion of the electromagnetic energy that is propagating through the waveguide 100. The radiation elements 106-110, as shown in FIG. 1, may be located on the surface of the waveguide 100. Additionally, as shown in FIG. 1, the radiation elements 106-110 may be located primarily on the short-side 102b of the waveguide 100. Further, as shown in FIG. 1, the radiation elements 106-110 may be configured to radiate electromagnetic energy in the Z direction. However, in some examples, the radiation elements 106-110 may be alternatively arranged on other sides of the waveguide 100 such as the broad-side 102a according to the particular application of the waveguide 100.

The radiation element 106 (e.g., linear slot) may be a traditional waveguide radiating slot. Accordingly, the linear slot 106 may have a polarization in the same direction as the long dimension of the slot. The long dimension of the linear slot 106, measured in the Y direction, may be approximately one-half of the wavelength of the electromagnetic energy that is propagating through the waveguide 100. At 77 Ghz, for example, the long dimension of the linear slot 106 may be approximately 1.95 mm. As shown in FIG. 1, in some examples, the linear slot 106 may have a long dimension that is larger than the second width 104b of the short-side 102b. Thus, in these examples, the linear slot 106 may be too long to fit on just the short-side 102b of the waveguide 100. The linear slot 106 may continue on to the top (e.g., broad-side 102a) and bottom of the waveguide 100. Additionally, in some examples, a rotation of the linear slot 106 may be adjusted with respect to the orientation of the waveguide 100. By rotating the linear slot 106, for example, an impedance of the linear slot 106 and a polarization of the radiation may be adjusted.

Additionally, the linear slot 106 has a width dimension that may be measured in the X direction. Generally, the width of the waveguide 100 (e.g., the first width 104a) may be varied to adjust the bandwidth of the linear slot 106. In some embodiments, the width of the linear slot 106 may be approximately 10% of the wavelength of the electromagnetic energy that is propagating through the waveguide 100. At 77 Ghz, for example, the width of the linear slot 106 may be approximately 0.39 mm. However, the width of the linear slot 106 may be made wider or narrower in various embodiments.

However, in some situations, it may not be practical or possible for the waveguide 100 to have a slot on any side other than the short-side 102b. For example, some manufacturing processes may create a waveguide structure in layers. The layers may cause only one side of the waveguide 100 to be exposed to free space. When the layers are created, the top and bottom of the waveguide 100 (e.g., the broad-side 102a, etc.) may not be exposed to free space. Thus, a radiation element that extended to the top and bottom on the waveguide 100 would not be fully exposed to free space, and therefore would not function correctly, in some configurations of the waveguide 100. Therefore, in some embodiments, radiation elements 108 and 110 (e.g., folded slots) may be used to radiate electromagnetic energy from inside the waveguide.

A waveguide may include slots of varied dimensions, such as folded slots 108 and 110, in order to radiate electromagnetic energy. For example, folded slots 108-110 may be used on a waveguide in situations when a half-wavelength sized slot similar to the linear slot 106 cannot fit on the side of the waveguide. The folded slots 108-110 each may have an associated length and width. The total length of the folded slots 108-110 (e.g., resonance length, etc.), as measured through a curve or a bend in the folded slot, may be approximately equal to half the wavelength of the electromagnetic energy in the wave. Thus, in some examples, at the same operating frequency, the folded slots 108-110 may have approximately the same overall length as the linear slot 106. As shown in FIG. 1, folded slots 108-110 are Z-Slots, as each is shaped like the letter Z. In various embodiments, other shapes may be used as well. For example, both S-Slots and 7-Slots may be used as well (where the slot is generally shaped, respectively, similarly to the letter S and the number 7).

The folded slots 108-110 may also each have a rotation angle. Similarly as described above for the linear slot 106, a rotation of the folded slots 108-110 may be adjusted with respect to the orientation of the waveguide 100. By rotating the folded slots 108-110, an impedance of the folded slots 108-110 and a polarization of the radiation may be adjusted.

Figure 2:
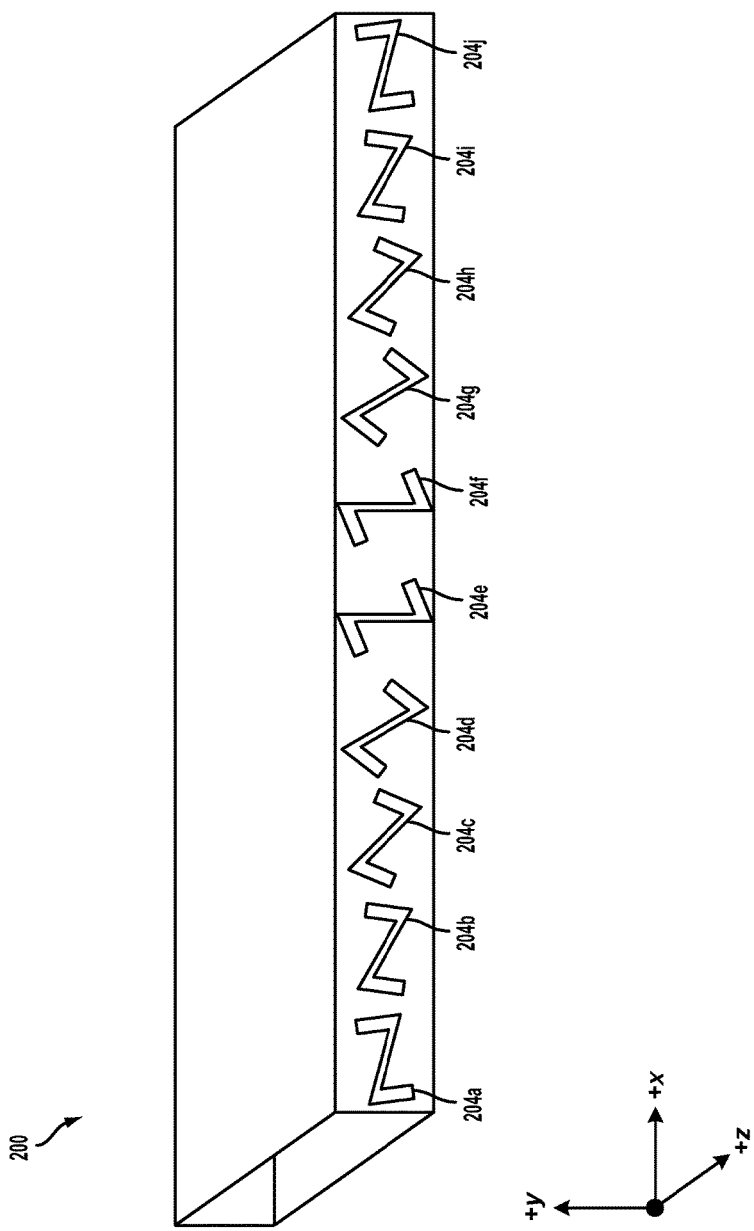
FIG. 2 illustrates an example waveguide with ten radiating Z-Slots, in accordance with at least some embodiments herein.

FIG. 2 illustrates an example waveguide 200 with ten radiating Z-Slots 204a-204j, in accordance with at least some embodiments herein. As electromagnetic energy propagates down the waveguide 200, a portion of the electromagnetic energy may couple into one or more of the radiating Z-Slots 204a-204j on the waveguide 200. In turn, the radiating Z-Slots 204a-204j on the waveguide 200 may be configured to radiate an electromagnetic signal (in the Z direction), for example. In some instances, the radiating Z-Slots 204a-204j may have an associated impedance. The impedance for each respective radiating Z-Slot 204a-204j may be a function of the both the dimensions of the respective slot and the rotation angle of the respective slot. The impedance of each respective slot may determine a coupling coefficient for each respective radiating Z-Slot. The coupling coefficient determines a percentage of the electromagnetic energy propagating down the waveguide 200 that is radiated by the respective Z-Slot.

In some embodiments, the radiating Z-Slots 204a-204j may be configured with rotations based on a taper profile. The taper profile may specify a given coupling coefficient for each radiating Z-Slots 204a-204j. Additionally, the taper profile may be chosen to radiate a beam with a desired beamwidth. For example, in one embodiment shown in FIG.

2, in order to obtain the taper profile, the radiating Z-Slots 204a-204j may each have an associated rotation. The rotation of each radiating Z-Slot 204a-204j may cause the impedance of each slot to be different, and thus cause the coupling coefficient for each radiating Z-Slot 204a-204j to correspond to the taper profile.

Although FIG. 2 shows the radiating Z-Slots 204a-204j arranged along a short-side of the waveguide 200, other arrangements are possible as well. In one example, the radiating Z-Slots 204a-204j may be arranged along a broad-side of the wave guide 200. In another example, some Z-slots of the radiating Z-Slots 204a-204j may be arranged along the short-side and other Z-slots of the radiating Z-Slots 204a-204j may be arranged along the broad-side.

Figure 3:
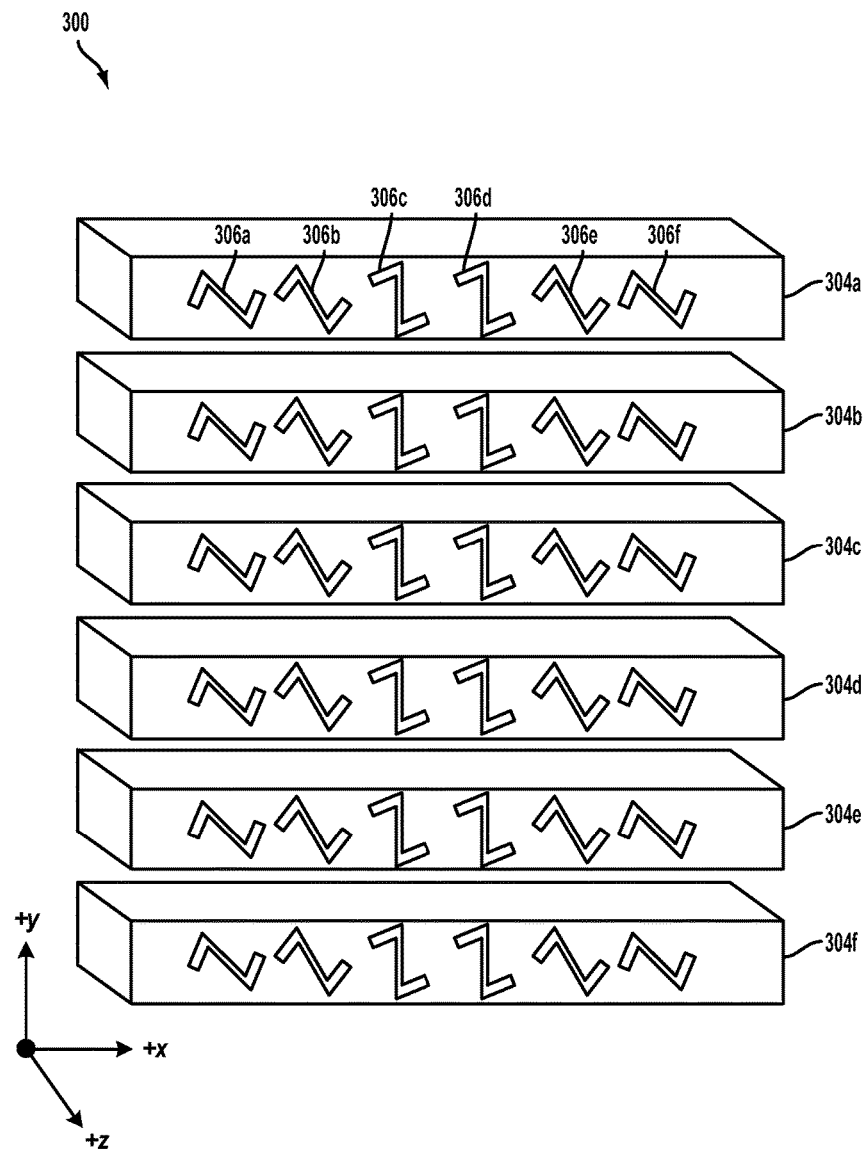
FIG. 3 illustrates an example waveguide array antenna with six radiating waveguides, in accordance with at least some embodiments herein.

FIG. 3 illustrates an example waveguide array antenna 300 with six radiating waveguides 304a-304f, in accordance with at least some embodiments herein. Each of the six radiating waveguides 304a-304f may have radiating Z-Slots. For example, FIG. 3 shows the waveguide 304a having the radiating Z-Slots 306a-306f. Each of the six radiating waveguides 304a-304f may be similar to the waveguide 200 described with respect to FIG. 2. The configuration of the six radiating waveguides 304a-304f of the waveguide array antenna 300 may be based on both a desired radiation pattern and a manufacturing process for the waveguide array antenna 300. Two example components of the radiation pattern of the waveguide array antenna 300 include a beamwidth as well as a beam angle. For example, similarly to the discussion of FIG. 2, a taper profile of the radiating Z-Slots 306a-306f of each of the radiating waveguides 304a-304f may control a beamwidth and/or side lobe level (SLL) of the waveguide array antenna 300. A beam angle of the waveguide array antenna 300 may correspond to an angle with respect to an antenna plane (e.g. the X-Y plane) over which a majority of the radiated energy from waveguide array antenna 300 is directed.

Figure 4:
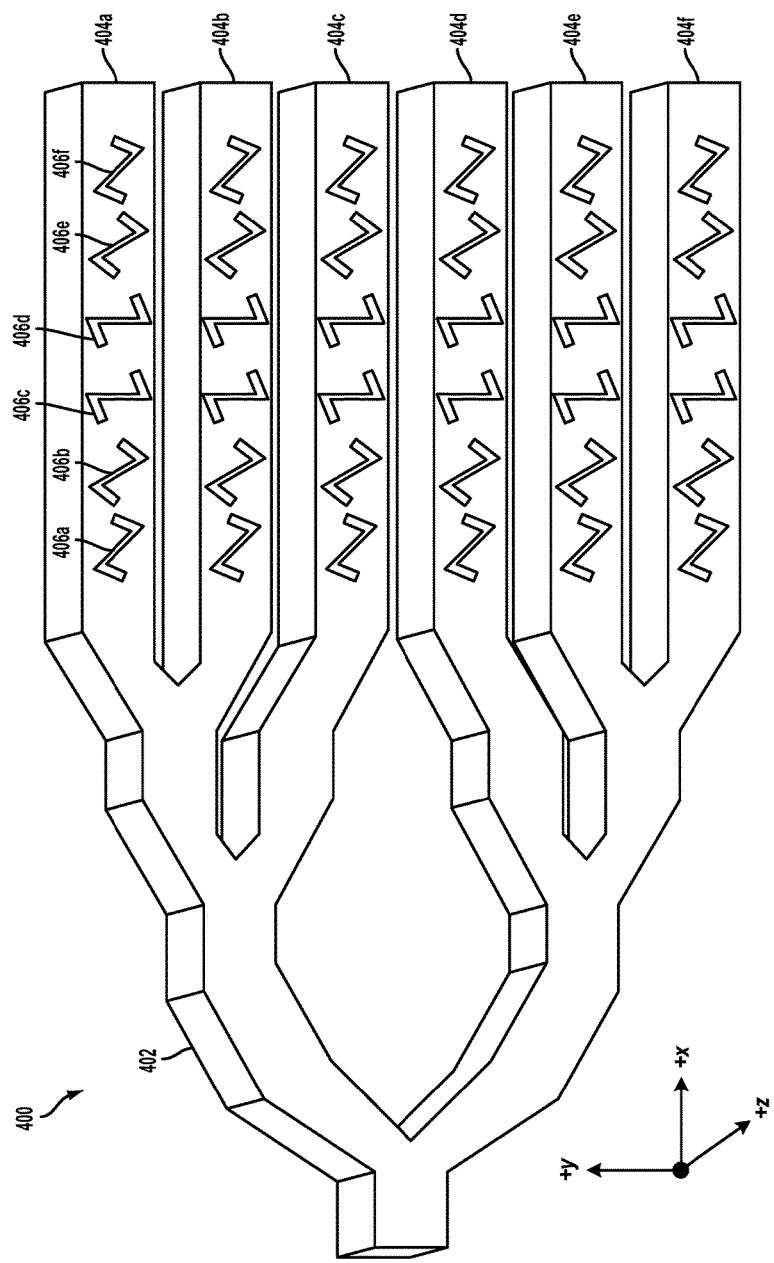
FIG. 4 illustrates an example waveguide array antenna with six radiating waveguides and a waveguide feed system, in accordance with at least some embodiments herein.

FIG. 4 illustrates an example waveguide array antenna 400 with six radiating waveguides 404a-404f and a waveguide feed system 402, in accordance with at least some embodiments herein. The six radiating waveguides 404a-404f may be similar to the six radiating waveguides 304a-304f of FIG. 3. In some embodiments, the waveguide feed system 402 may be configured to receive an electromagnetic signal at an input port and divide the electromagnetic signal between the six radiating waveguides 404a-404f. Thus, the signal that each radiating Z-Slot 406a-406f of the radiating waveguides 404a-404f radiates may propagate in the X direction through the waveguide feed system. In various embodiments, the waveguide feed system 402 may have different shapes or configurations than that shown in FIG. 4. Based on the shape and configuration of the waveguide feed system 402 various parameters of the radiated signal may be adjusted. For example, a direction, a beamwidth, and/or an SLL of a radiated beam may be adjusted based, at least in part, on the shape and configuration of the waveguide feed system 402.

Figure 5:
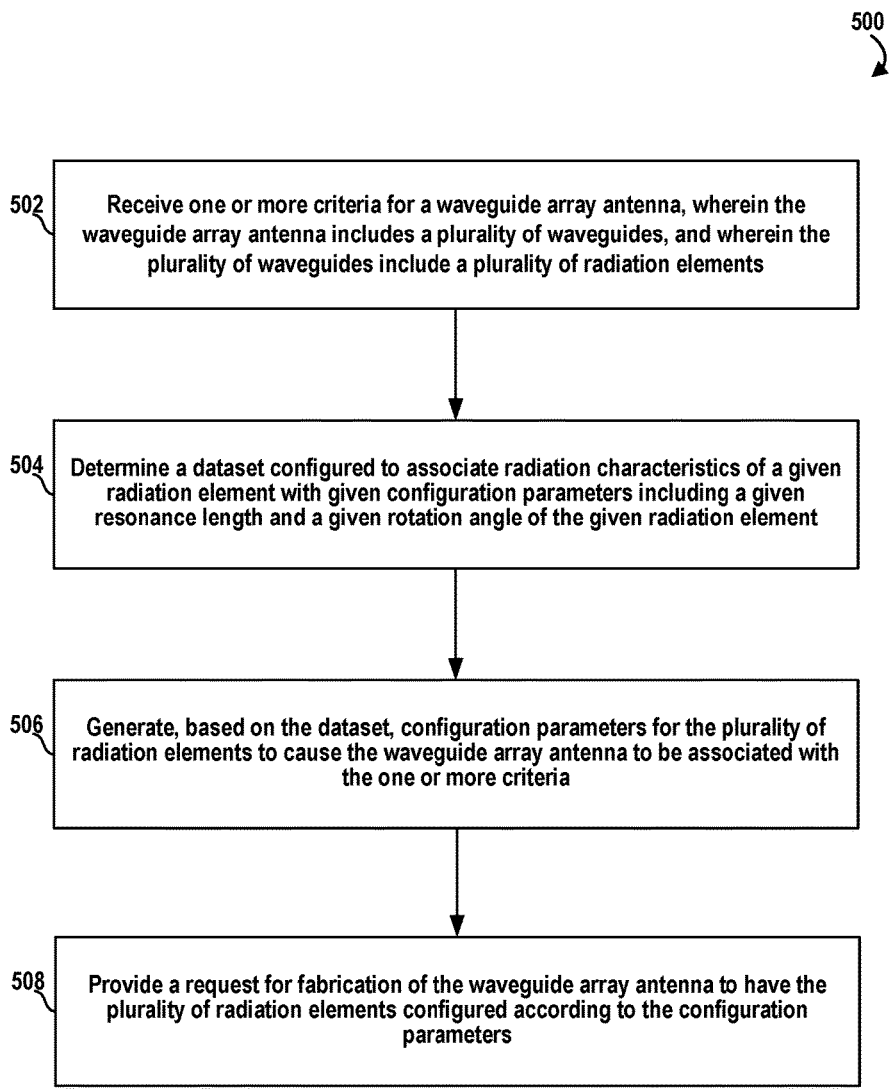
FIG. 5 illustrates an example method, in accordance with at least some embodiments herein.

FIG. 5 is a block diagram of an example method 500, in accordance with at least some embodiments described herein. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In some examples, for the method 500 and other processes and methods disclosed herein, each block may represent circuitry that is wired to perform the specific logical functions in the process.

At block 502, the method 500 includes receiving one or more criteria for a waveguide array antenna. The waveguide array antenna may include a plurality of waveguides. The plurality of waveguides may include a plurality of radiation elements. By way of example, the method 500 may be performed by a computing device that receives the one or more criteria and provides a request for fabrication of the waveguide array antenna according to the one or more criteria. The waveguide array antenna may be similar to the waveguide array antennas 300 and 400. For example, the plurality of waveguides may be similar to the waveguides 404a-404f, and the plurality of radiation elements may be similar to the Z-slots 406a-406f.

In some examples, the one or more criteria may include desired characteristics such as a taper profile, beamwidth characteristics, sidelobe characteristics, polarization, directivity, etc., of electromagnetic energy radiated by the waveguide array antenna. Further, in some examples, the one or more criteria may include desired electronic characteristics such as input impedance, gain, efficiency, frequency bandwidth, etc., of the waveguide array antenna. Additionally, in some examples, the one or more criteria may include desired physical characteristics such as size, weight, volume, form factor shape, etc., of the waveguide array antenna.

In some examples, such physical characteristics may be associated with use (e.g., installation/mounting requirements, etc.) or manufacture of the waveguide array antenna. For example, where manufacture of the waveguide array antenna requires stacking the plurality of waveguides prior to forming the radiation elements (e.g., drilling slots), the one or more criteria may indicate that the plurality of radiation elements (e.g., slots) may be in a given arrangement along short-sides and/or broad-sides of the plurality of waveguides, similarly to the Z-slots 406a-406f of the waveguide array antenna 400, to allow ease of access to corresponding sides of the waveguides during manufacture. Accordingly, in some examples, a given waveguide may have a broad-side having a first width and a short-side having a second width less than the first width, similarly to the waveguide 100. Additionally, in some examples, the plurality of radiation elements may be arranged within short-sides of the plurality of waveguides according to a given arrangement. Further, in some examples, the one or more criteria may indicate a number of the plurality of radiation elements or a shape of the plurality of radiation elements (e.g., Z-slots, S-slots, 7-slots, linear slots, etc.). Thus, in some examples, a given radiation element may have a linear shape similar to the linear slot 106 or a non-linear shape similar to the folded slots 108-110 of the waveguide 100. Additionally, in some examples, the waveguide array antenna may correspond to a short-wall slotted waveguide array antenna (e.g., the plurality of radiation elements may be positioned at short-sides of the plurality of waveguides).

At block 504, the method 500 includes determining a dataset configured to associate radiation characteristics of a given radiation element with given configuration parameters including a given resonance length and a given rotation angle of the given radiation element.

By way of example, a computing device may perform the functions of block 504 via an electromagnetic simulation process such as a finite element method (FEM) solver. For instance, simulated properties such as admittance, conductance, susceptance, etc., of the given radiation element may be mapped at block 504 to the given resonance length of the given radiation element. Further, the simulated properties mapped to the given resonance length may be also generated for various given rotation angles. In some examples, a normalization factor may be applied to the simulated properties (e.g., admittance, etc.). An example normalization factor may be the TE10 mode impedance ($Z_o$) of the given waveguide.

Further, in some examples, interpolation and/or curve fitting techniques may be performed by the method 500 to determine additional relationships between the radiation characteristics of the given radiation element and the given configuration parameters (e.g., the given resonance length, the given rotation angle, etc.). For example, a map between conductance and rotation angle, resonance length and rotation angle, etc., may also be determined at block 504 and stored in the dataset.

At block 506, the method 500 includes generating configuration parameters for the plurality of radiation elements based on the dataset. The configuration parameters may be to cause the waveguide array antenna to be associated with the one or more criteria.

By way of example, a half-space model of the waveguide array antenna may be simulated by the computing device. For instance, physical aspects (e.g., size, shape, number of waveguides, given arrangement of plurality of radiation elements, etc.) of the waveguide array antenna may be determined based on the one or more criteria. Further, for instance, radiation characteristics such as a desired amplitude taper correction due to mutual coupling, etc., may be indicated in the one or more criteria and utilized to determine delta corrections to the initial conductances of the plurality of radiation elements.

At this point, the dataset of block 504 may be utilized to determine first configuration parameters (e.g., resonance lengths, rotation angles, etc.) that correspond to the initial conductances. Further, for example, the half-space model may be utilized to determine mutual coupling voltages of the waveguide array based on the first configuration parameters. In turn, the mutual coupling voltages may be utilized to adjust the conductance values for mutual coupling. Further, the dataset of block 504 may be then utilized to determine second configuration parameters (e.g., resonance lengths, rotation angles, etc.) that take into account the mutual coupling.

At this point, a computing device of the method 500 may then determine a full array model for the waveguide array antenna using the second configuration parameters. For example, a desired input impedance (indicated in the one or more criteria) of the waveguide array antenna may be compared with the actual input impedance caused by the second configuration parameters. If the desired input impedance does not match the actual input impedance, the half-space model process may be repeated to obtain new configuration parameters until the desired input impedance is matched.

Accordingly, in some examples, the method 500 may also include determining given impedances associated with given configuration parameters of the given radiation element based on the dataset. In these examples, the method 500 may also include determining the configuration parameters of the plurality of radiation elements from within the dataset based on the given impedances. The configuration parameters, in these examples, may cause the waveguide array antenna to have a particular input impedance indicated by the one or more criteria. Additionally, in some examples, the method 500 may also include determining mutual impedances of the plurality of radiation elements based on the given impedances. The mutual impedances may pertain to mutual coupling between the plurality of radiation elements associated with the given arrangement. In these examples, determining the configuration parameters from within the dataset may be based also on the mutual impedances.

Further, in some examples, the final full array model with the final configuration parameters may be compared with other criteria such as pattern, gain, half power beamwidth (HPBW), sidelobe level (SLL), etc. If the other criteria are not met, then the process may be repeated with new parameters until the configuration parameters for the plurality of radiation elements that are associated with the one or more criteria are generated. It is noted that the dataset of block 504 allows generating various combinations of the configuration parameters until suitable configuration parameters are generated for the one or more criteria received at block 502.

Accordingly, in some examples, the method 500 may also include determining radiation patterns associated with the given configuration parameters of the given radiation element that correspond to a given input signal to the given radiation element based on the dataset. In these examples, the method 500 may also include determining the configuration parameters of the plurality of radiation elements based on a comparison between the radiation patterns and a particular radiation pattern of the waveguide array antenna indicated by the one or more criteria. The configuration parameters may cause the waveguide array antenna to have the particular radiation pattern.

At block 508, the method 500 includes providing a request for fabrication of the waveguide array antenna to have the plurality of radiation elements configured according to the configuration parameters. For example, a computing device performing the method 500 may store the configuration parameters as an instruction data file that may be utilized by a machining system to drill holes in a metal substrate to form the waveguide array antenna according to the configuration parameters (e.g., similar to the waveguide array antenna 400).

Figure 6:
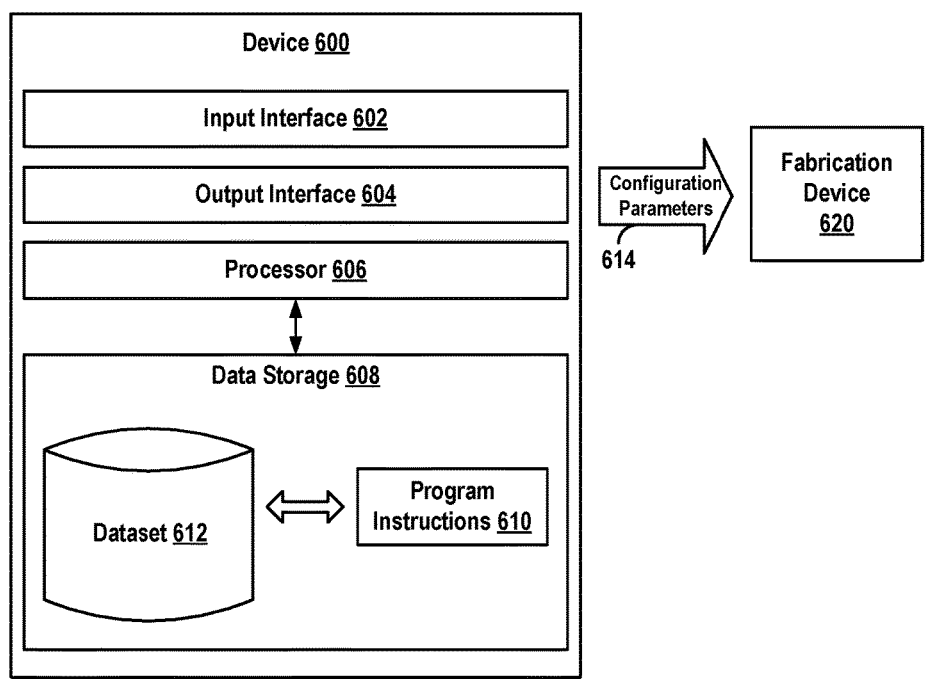
FIG. 6 illustrates an example computing device, in accordance with at least some embodiments herein.

FIG. 6 illustrates an example computing device 600, in accordance with at least some embodiments herein. The device 600 includes an input interface 602, an output interface 604, a processor 606, and data storage 608. FIG. 6 also shows a fabrication device 620 that may be configured to receive configuration parameters 614 from the device 600, and to synthesize a waveguide array antenna, similar to antennas 300-400, based on the configuration parameters 614.

The device 600 may include a computing device such as a smart phone, digital assistant, digital electronic device, body-mounted computing device, personal computer, server, or any other computing device configured to execute program instructions 610 included in the data storage 608 to operate the device 600. The device 600 may include additional components (not shown in FIG. 6), such as a camera, an antenna, or any other physical component configured, based on the program instructions 610 executable by the processor 606, to operate the device 600. The processor 606 included in the device 600 may comprise one or more processors configured to execute the program instructions 610 to operate the device 600.

The input interface 602 may include an input device such as a microphone, keyboard, mouse, touchscreen, or any other component configured to provide an input signal to the processor 606 comprising one or more criteria for a waveguide array antenna similarly to the one or more criteria at block 502 of the method 500.

The output interface 604 may include an output device such as a display, liquid crystal display (LCD), light emitting diode (LED) display, projection display, cathode ray tube (CRT) display, or any other output device configured to provide an output signal comprising configuration parameters 614 for the waveguide array antenna (e.g., resonance lengths, rotation angles, etc. of radiation elements) similarly to the configuration parameters of the method 500.

In some examples, the configuration parameters 614 may be provided by the output interface 604 to the fabrication device 620 that is configured to synthesize the waveguide array antenna according to the configuration parameters 614. In still other examples, the configuration parameters 614 may be stored in the data storage 608 or any other data storage (not shown in FIG. 6) for later processing (e.g., by the fabrication device 620, etc.).

In one example, the fabrication device 620 may include a machining system such as a drill, saw, Computer Numerical Control (CNC) drill press, other CNC machine tools, oven, press, other machining tools, etc. In another example, the fabrication device 620 may include an etching system such as chemical etching system, laser etching system, etc. Thus, the fabrication device 620 may be configured to form the slots (e.g., radiation elements) on the waveguide array antenna and/or shape solid materials (e.g., metal, plastic, carbon fiber, etc.) to synthesize the waveguide array antenna in accordance with the configuration parameters 614 similarly to the antennas 300-400.

Accordingly, in some examples, the input interface 602 and/or the output interface 604 may include network interface components configured to, respectively, receive and/or transmit the input signal and/or the output signal described above. For example, an external computing device (e.g., server, etc.) may provide the input signal (e.g., one or more criteria, etc.) to the input interface 602 via a communication medium such as Wifi, WiMAX, Ethernet, Universal Serial Bus (USB), or any other wired or wireless medium. Similarly, for example, the fabrication device 620 may receive the output signal from the output interface 104 via the communication medium described above to synthesize the waveguide array antenna.

The data storage 608 may include one or more memories (e.g., flash memory, Random Access Memory (RAM), solid state drive, disk drive, etc.) that include software components configured to provide the program instructions 610 executable by the processor 606 to operate the device 600. Although FIG. 6 shows the data storage 608 physically included in the device 600, in some examples, the data storage 608 or some components included thereon may be physically stored on a remote computing device. For example, some of the software components (e.g., program instructions 610, dataset 612, etc.) in the data storage 608 may be stored on a remote server accessible by the device 600. The data storage 608 may include the program instructions 610 and the dataset 612.

The program instructions 610 may include instructions executable by the processor 606 to cause the device 600 to perform functions of the present disclosure, such as the functions of the method 500. The program instructions 610 may be implemented, for example, as an application programming interface (API), dynamically-linked library (DLL), or any other software implementation suitable for providing the program instructions 610 to the processor 606.

The dataset 612 may be similar to the dataset described at block 504 of the method 500. For example, the dataset 612 may include a mapping between radiation characteristics of a radiation element (e.g., Z-slot, etc.) and given configuration parameters of the radiation element (e.g., resonance length, rotation angle, position, etc.).

Figure 7:
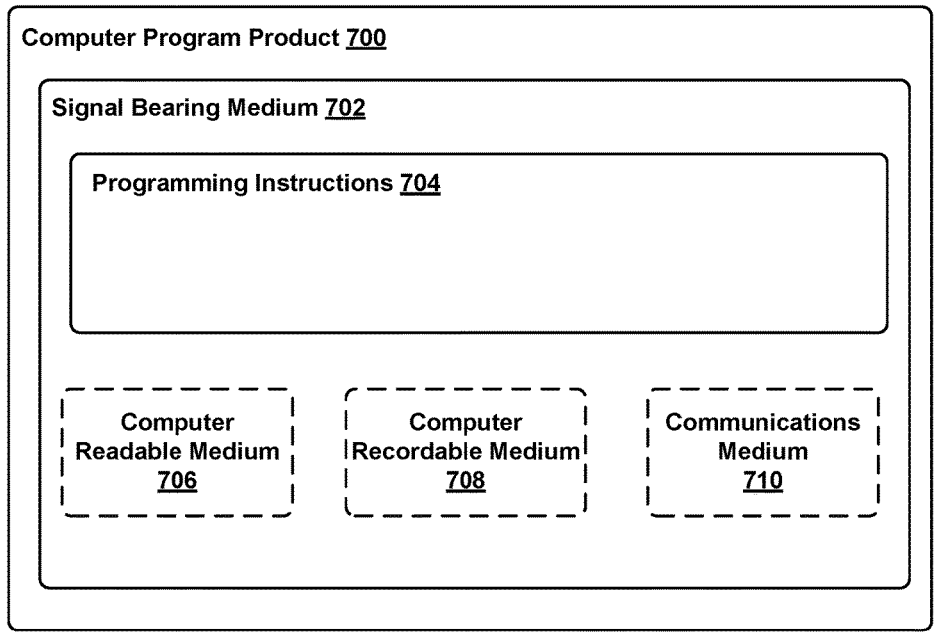
FIG. 7 depicts an example computer readable medium configured according to an example embodiment.

FIG. 7 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., method 500, etc.) may be implemented by computer program instructions encoded on a computer readable storage media in a machine-readable format, or on other media or articles of manufacture (e.g., program logic 610 of the device 600). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a computer-readable medium 706, such as, but not limited to, a hard disk drive, a Compact Disc (CD), a Digital Video Disk (DVD), a digital tape, memory, etc. In some implementations, the signal bearing medium 702 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, by a device that includes one or more processors, one or more criteria for an antenna that includes one or more waveguides and a plurality of radiation elements along one or more sides of the one or more waveguides;
    accessing a dataset configured to associate given radiation characteristics of a given radiation element with given configuration parameters related to at least a size or an orientation of the given radiation element; and
    generating, based on the dataset, configuration parameters for the plurality of radiation elements to cause the antenna to be associated with the one or more criteria.

2. The method of claim 1, further comprising:
    providing, by the device, a representation of the antenna based on the generated configuration parameters.

3. The method of claim 1, further comprising:
    providing, by the device, instructions for fabricating the antenna according to the generated configuration parameters of the plurality of radiation elements.

4. The method of claim 1, further comprising:
    generating the dataset based on simulation of the given radiation characteristics associated with the given configuration parameters.

5. The method of claim 1, wherein the given configuration parameters relate to the size and the orientation of the given radiation element.

6. The method of claim 1, wherein the one or more criteria include an indication of one or more characteristics for the antenna, and wherein generating the configuration parameters is further based on the one or more characteristics indicated by the one or more criteria.

7. The method of claim 6, wherein the one or more characteristics include one or more of: size of the antenna, shape of the antenna, weight of the antenna, volume of the antenna, radiation characteristics of the antenna, input impedance of the antenna, gain of the antenna, efficiency of the antenna, frequency bandwidth of the antenna, polarization of the antenna, directivity of the antenna, beamwidth characteristics of the antenna, sidelobe characteristics of the antenna, a given arrangement of the plurality of radiation elements, a number of the plurality of radiation elements, a number of the one or more waveguides, shapes of the plurality of radiation elements, or shapes of the one or more waveguides.

8. The method of claim 1, wherein a given waveguide of the one or more waveguides has a broad-side having a first width and a short-side having a second width less than the first width.

9. The method of claim 8, wherein the one or more criteria include a criterion related to the plurality of radiation elements being arranged within short-sides of the one or more waveguides, and wherein generating the configuration parameters is further based on the plurality of radiation elements being arranged within the short-sides of the one or more waveguides.

10. The method of claim 1, wherein the one or more criteria include an indication of a particular radiation pattern for the antenna, the method further comprising:
    determining, based on the dataset, simulated radiation patterns for the given radiation element and the given configuration parameters associated with the simulated radiation patterns,
    wherein generating the configuration parameters of the plurality of radiation elements in the antenna is further based on at least a comparison between the simulated radiation patterns of the given radiation element and the particular radiation pattern indicated in the one or more criteria.

11. The method of claim 1, wherein the one or more criteria include an indication of a particular impedance for the antenna, the method further comprising:
    determining, based on the dataset, simulated impedances for the given radiation element and the given configuration parameters associated with the simulated impedances,
    wherein generating the configuration parameters of the plurality of radiation elements in the antenna is further based on at least the simulated impedances of the given radiation element and the particular impedance indicated in the one or more criteria.

12. The method of claim 11, wherein the one or more criteria include an indication of a given arrangement of the plurality of radiation elements in the antenna, the method further comprising:
    based on at least the generated configuration parameters, the simulated impedances, and the given arrangement, determining mutual impedances associated with mutual coupling of the plurality of radiation elements in the given arrangement; and
    based on the mutual impedances, adjusting the generated configuration parameters of the plurality of radiation elements to cause the antenna to have the particular impedance.

13. A non-transitory computer readable medium having stored therein instructions, that when executed by a computing device, cause the computing device to perform operations comprising:
receiving one or more criteria for an antenna that includes one or more waveguides and a plurality of radiation elements along one or more walls of the one or more waveguides;
accessing a dataset configured to associate given radiation characteristics of a given radiation element with given configuration parameters related to at least a size or an orientation of the given radiation element; and
generating, based on the dataset, configuration parameters for the plurality of radiation elements that cause the antenna to be associated with the one or more criteria.

14. The non-transitory computer readable medium of claim 13, wherein the given radiation element has a non-linear shape.

15. The non-transitory computer readable medium of claim 13, wherein the antenna is a slotted waveguide array antenna, and wherein the plurality of radiation elements corresponds to slots in the one or more walls of the one or more waveguides.

16. The non-transitory computer readable medium of claim 15, wherein the plurality of radiation elements include Z-shaped slots.

17. The non-transitory computer readable medium of claim 15, wherein the plurality of radiation elements include S-shaped slots.

18. A device comprising:
one or more processors; and
data storage configured to store instructions executable by the one or more processors to cause the device to:
receive one or more criteria for an antenna that includes one or more waveguides and a plurality of radiation elements along one or more sides of the one or more waveguides;
access a dataset configured to associate given radiation characteristics of a given radiation element with given configuration parameters related to at least a size or an orientation of the given radiation element; and
generate, based on the dataset, configuration parameters for the plurality of radiation elements that cause the antenna to be associated with the one or more criteria.

19. The device of claim 18, wherein the size of the given radiation element relates to a resonance length of the given radiation element, and wherein generating the configuration parameters comprises determining respective resonance lengths of the plurality of radiation elements that cause the antenna to be associated with the one or more criteria.

20. The device of claim 18, wherein the orientation of the given radiation element relates to a rotation angle of the given radiation element, and wherein generating the configuration parameters comprises determining respective rotation angles of the plurality of radiation elements that cause the antenna to be associated with the one or more criteria.

* * * * *